United States Patent [19]

Benini

[11] 4,193,114

[45] Mar. 11, 1980

[54] TICKET-ISSUING SYSTEM

[75] Inventor: Fernando Benini, Zola Predosa, Italy

[73] Assignee: CIR- S.p.A.-Divisione Sasib, Bologna, Italy

[21] Appl. No.: 918,283

[22] Filed: Jun. 22, 1978

[30] Foreign Application Priority Data

Jun. 30, 1977 [IT] Italy .............................. 12665 A/77

[51] Int. Cl.[2] .......................... G06F 3/02; G06F 3/12; G06F 3/14

[52] U.S. Cl. ...................................................... 364/200

[58] Field of Search ... 364/200 MS File, 900 MS File

[56] References Cited

U.S. PATENT DOCUMENTS

| | | | |
|---|---|---|---|
| 3,281,793 | 10/1966 | Oerters et al. | 364/900 |
| 3,533,084 | 10/1970 | Cook et al. | 364/200 X |
| 3,688,276 | 8/1972 | Quinn | 364/200 |
| 3,931,761 | 1/1976 | Carrus et al. | 364/900 |
| 4,032,946 | 6/1977 | Wakatsuki et al. | 364/900 |

FOREIGN PATENT DOCUMENTS 1339187 11/1973 United Kingdom .

*Primary Examiner*—Harvey E. Springborn

*Attorney, Agent, or Firm*—Spencer & Kaye

[57] ABSTRACT

A ticket-issuing system comprising an alphabetical keyboard which permits, through a suitable circuit arrangement, to introduction into the data processing section of the system the name of a station of destination by omitting from the station name one or more letters. Instead, each group of omitted letters is represented by depressing a key which indicates such omission. After such keying operation, there will appear on the video display of the system either the name of the desired destination, or a list of names of destinations which satisfy the introduced request. The destinations appearing on the video display are accompanied by a code number which permits the operator to definitively key the destination into the machine for the issuance of the ticket. The ticket-issuing machine further comprises an immediate selection keyboard, presenting a plurality of keys for the immediate selection of a number of destinations which are the most frequently requested from the station at which the system is located.

6 Claims, 1 Drawing Figure

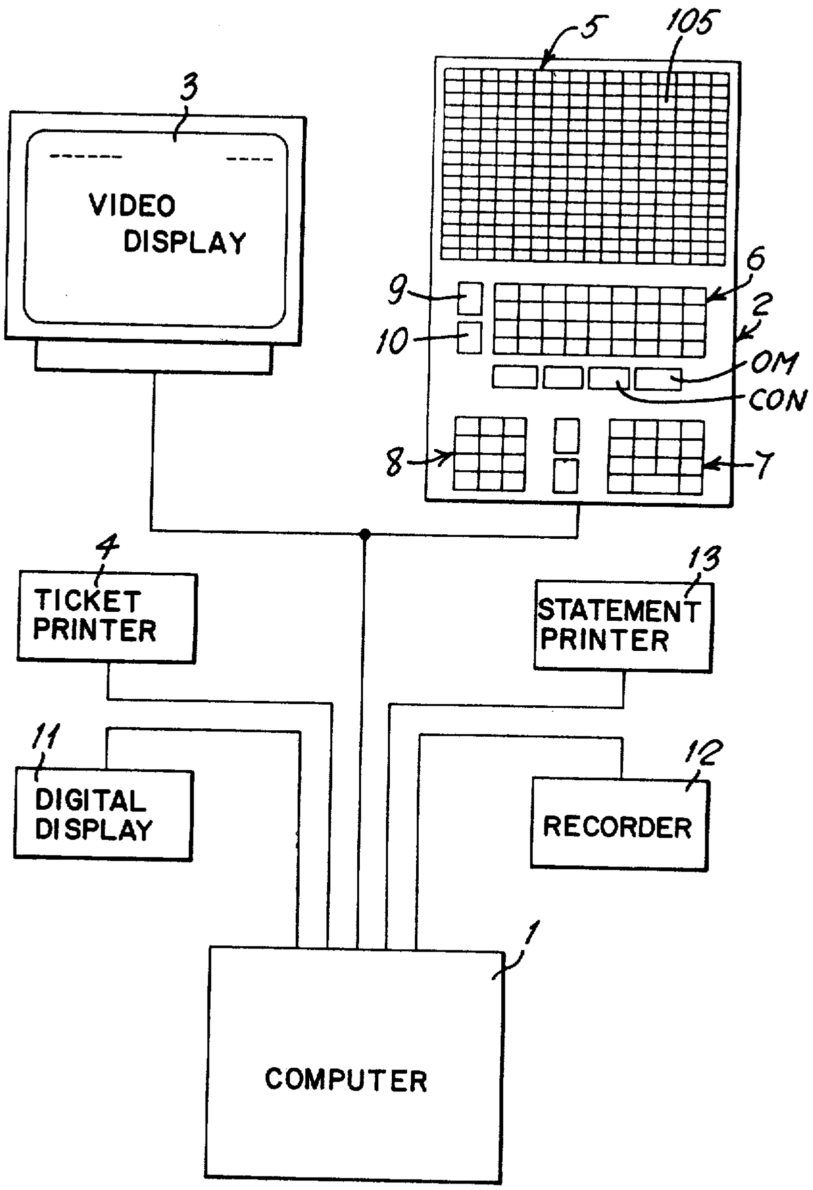
3
VIDEO DISPLAY
5
105
6
2
9
10
OM
CON
8
7
4
TICKET PRINTER
13
STATEMENT PRINTER
11
DIGITAL DISPLAY
12
RECORDER
1
COMPUTER

TICKET-ISSUING SYSTEM

SUMMARY OF THE INVENTION

The present invention relates to an electronic system for issuing tickets, and more particularly travel tickets such as railway tickets which define a selected destination by a plurality of consecutive letters. A system of this type comprises a programmed computer, a ticket-printer controlled by the computer, a keyboard associated with the computer for introducing the data necessary for defining the selected destination to the programmed computer, and a viewer screen or video display for the visual indication of at least the information needed by the system operator for issuance of the ticket.

According to the invention, the ticket-issuing system comprises an alphabetical keyboard which , through a suitable circuit arrangement, permits introduction of, the name of a station of destination into the data processing section of the computer. This is accomplished in the present invention by omitting from the name of the station one or more letters and by depressing on the keyboard, instead of the omitted letters, a particular key which indicates the omission of certain letters.

After such keying operation, there will appear on the video display either the name of the desired destination or a list of names of destinations which satisfy the introduced request. The destinations appearing on the video display are accompanied by a code number which the operator can use for definitively keying the requested destination into the system for issuance of the ticket.

According to another feature of the invention, the ticket-issuing system further comprises an immediate selection keyboard presenting a plurality of keys for the immediate selection of a number of destinations which are the most frequently requested from the particular station at which the system is located. By depressing the key of the immediate selection keyboard on which there is indicated (written) the name of the desired destination, the operator directly introduces into the data processing unit the call for the desired destination, without the need for any other search.

It appears evident that a ticket-issuing system constructed in accordance with the invention has a very high operational speed as a result of the simplified procedure which the operator follows in giving to the system the instructions for the search of the desired destination.

BRIEF DESCRIPTION OF THE DRAWING

The particular features and advantages of the system according to the invention will be evident from the following description of a preferred embodiment thereof, made with reference to the single FIGURE of the attached drawing, in which there is diagrammatically represented a block diagram of the ticket-issuing system.

DESCRIPTION OF THE PREFERRED EMBODIMENT

The ticket-issuing system comprises a programmed computer 1, to which there is coupled a keyboard panel 2, a video display 3 and a ticket printer 4.

The keyboard panel 2 presents an immediate selection keyboard 5, comprising a plurality of keys 105, each one of which carries the name of a station of destination, and which are arranged for example in rows according to alphabetical order, for the immediate selection of a number of destinations which are the most frequently requested from the station at which the machine is located (departure station).

The keyboard panel 2 further comprises an alphabetical keyboard 6 for keying the full name of the desired destination, or, as will be explained hereinafter, one or more letters (initial, intermediate, final) of the name of the destination. In conjunction with the alphabetical keyboard 6 there are provided two keys OM and CON, of which the key OM indicates the omission of one or more letters defining the name of the station, and the key CON provides confirmation to the operator that an instruction has been given to the system.

Also on the keyboard panel 2 there is provided a numerical keyboard 7, another keyboard 8 which provides keying information relating to particulars requirements of the desired ticket (class, fare, return, etc.) and other keys for the control of the ticket printer and for operations which will be described in detail.

With reference to the drawing, there will be now described some cases of operation of the system, by utilizing the key OM, i.e. the key which indicates the omission of a group of letters from the name of the desired destination.

EXAMPLE 1

The operator, in order to introduce ("call") the name of a desired destination, first depresses the key OM, and then terminates his call by keying, on the alphabetical keyboard 6, the final successive letters of the name of the destination station. Thus, if the desired destination is the station of PORTOFINO, the "call" will be as follows:

(OM)—FINO where (OM) indicates depressing the key OM. Then the operator depresses the key CON to confirm his call.

If the final group of letters FINO is sufficient to univocally identify the name of the desired destination (PORTOFINO), then this name will appear on the video display 3 and the operator will proceed with the procedure for issuance of the ticket.

If on the contrary, the final group of letters is not sufficient to uniquely identify the name of just one station, on the video display there will appear a list of destinations having in common such final group of letters, and, for each destination, there will also appear the respective code number. If the desired destination is present among the others on the video display, the operator keys the respective code number and confirms the instruction by further depressing the key CON. If the video display is completely occupied by a list of stations among which the operator does not see the required destination (of course the video display presents a limited number of lines), then the operator depresses a particular key 9 which will cause to appear on the video display 3 a successive list of possible destinations containing the keyed final group of letters, and so on, until there will appear the desired destination. If the desired destination has been inadvertently passed over, then the operator depresses the key 10 which "turns backwards the pages" of the video display 3 until the list of destinations comprising the desired destination again appears on the display.

EXAMPLE 2

The operator calls the name of the desired destination by keying the initial successive letters of the name and then by depressing the key OM. Having in mind the destination PORTOFINO of the preceding example, the call will be as follows:

PORTO—(OM)

With the obvious modifications, the procedure will then be the same as for Example 1.

EXAMPLE 3

Always referring to the destination PORTOFINO, the operator effects the following keying:

POR—(OM)—INO where (OM) stands for the intermediate group of letters TOF.

The search will be directed to all destinations starting with POR and ending with INO, with the omission of an intermediate group of letters.

EXAMPLE 4

Still with reference to the destination PORTOFINO the operator effects the following keying:

(OM)—TOF—(OM)

where the two (OM) stand for the initial group POR and the final group INO.

The search will be directed to destinations having an intermediate group TOF.

As it appears evident from the above examples, many other possibilities of combinations for the call of the desired destination are possible, practically their number being limited by the number of letters composing the name of the desired destination itself.

It is to be noted that at the end of any instruction (whether it is the call for searching the destination, or the keying of the retraced code number) the operator confirms the instruction by depressing the key CON.

Of course, the operator can call the desired destination by keying the complete name of the station of destination itself. This can take place, for instance, in the case of destinations having a very small number of letters (three or four) and not being of very frequent request (therefore not appearing on the immediate selection keyboard 5).

To the above described machine there can be associated also a digital display 11, for example for indicating the price of the ticket to the traveller, a printer 13 for recording the accounting operations on a statement sheet, and a magnetic-tape recorder 12 for statistical or other purposes.

It is believed that the invention will have been clearly understood from the foregoing detailed description of the preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. A system for issuing a ticket for travel to a selected destination having a name defined by a plurality of consecutive letters of the alphabet, comprising:
   - a programmed computer;
   - a ticket printer coupled to said computer;
   - a video display coupled to said computer for visually displaying at least the information required to define said selected destination; and
   - a keyboard panel coupled to said computer, said keyboard including an omission key and a set of alphabetical keys each representing a letter of the alphabet, the name of said selected destination being introduced into said computer by depressing alphabetical keys to represent certain of the letters in the name of said destination and depressing said omission key to represent the remainder of said letters.

2. A system for issuing a ticket according to claim 1 wherein the name of said selected destination is introduced into said computer by first depressing said omission key indicating the omission of one or more letters from the initial part of the name of said destination, and then depressing keys on said alphabetical keyboard to introduce the consecutive remaining letters of the name of said destination into said computer.

3. A system for issuing a ticket according to claim 1 wherein the name of said selected destination is introduced into said computer by first depressing keys on said alphabetical keyboard corresponding to the consecutive initial letters of the name of said destination, and then depressing said omission key.

4. A system for issuing a ticket according to claim 1 wherein the name of said selected destination is introduced into said computer by first depressing keys on said alphabetical keyboard corresponding to the consecutive initial letters of the name of said destination, then depressing said omission key, and finally depressing keys on said alphabetical keyboard corresponding to the consecutive remaining letters of the name of said destination.

5. A system for issuing a ticket according to claim 1 wherein the name of said selected destination is introduced into said computer by first depressing said omission key, then depressing keys on said alphabetical keyboard corresponding to consecutive intermediate letters of the name of said destination, and finally again depressing said omission key.

6. A system for issuing a ticket according to claim 1 wherein said keyboard panel further includes an immediate selection keyboard comprising a plurality of keys for the immediate selection of a number of destinations, each of said keys representing the name of a destination, whereby depressing a key of said immediate selection keyboard directly introduces into said computer the name of said selected destination.

* * * * *